May 28, 1968 M. B. PREEMAN 3,385,571
MOBILE MIXING PLANT
Filed Jan. 3, 1967 3 Sheets-Sheet 1
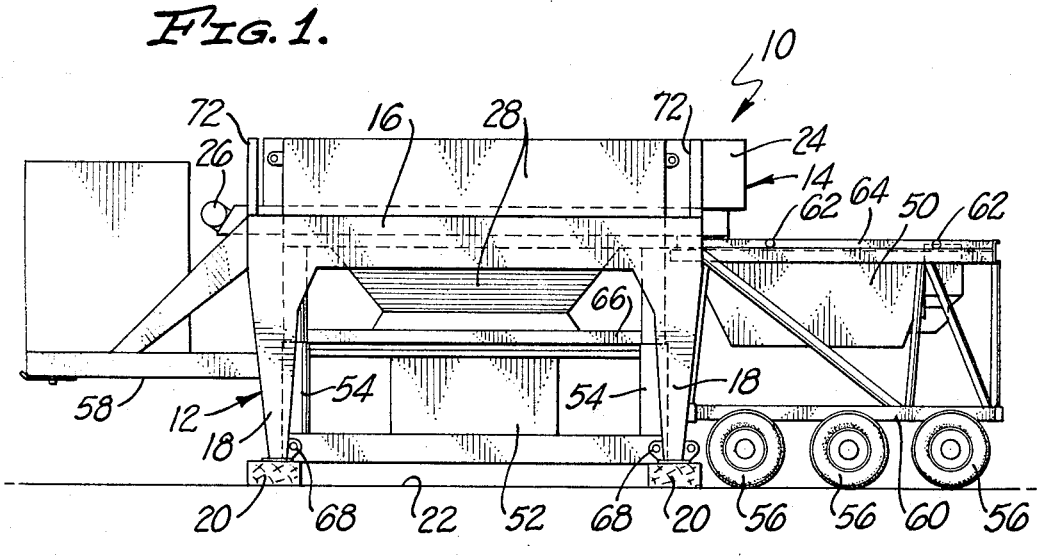
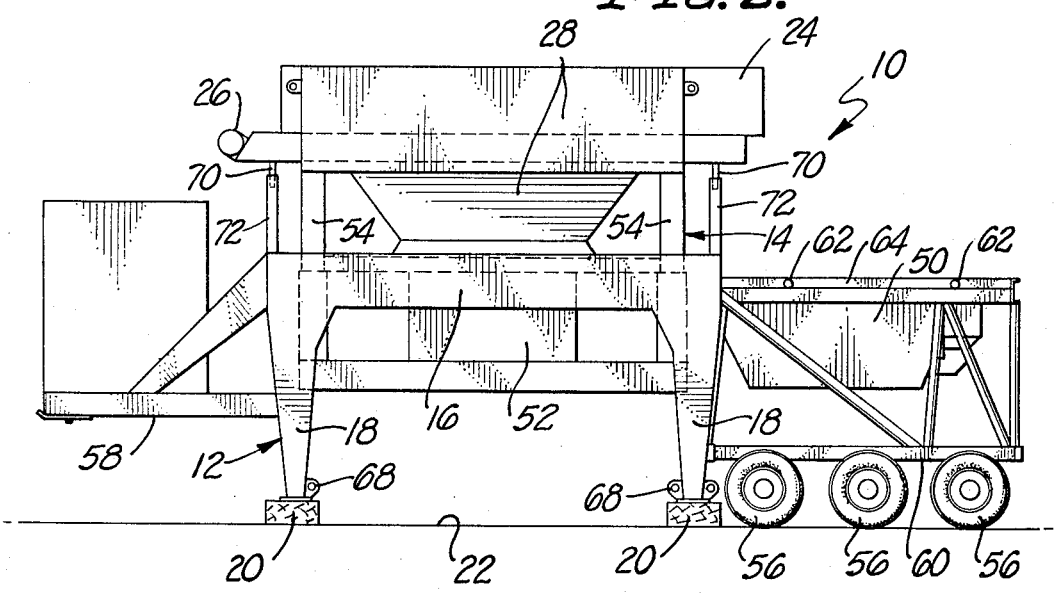
INVENTOR
MARVIN B. PREEMAN
BY HIS ATTORNEYS
HARRIS, KIECH, RUSSELL & KERN

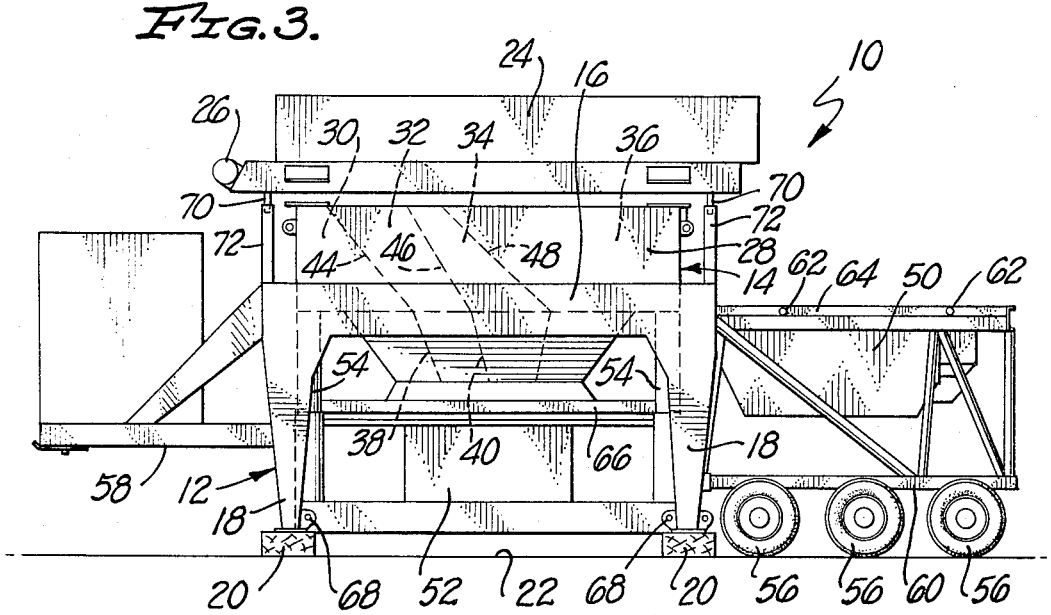
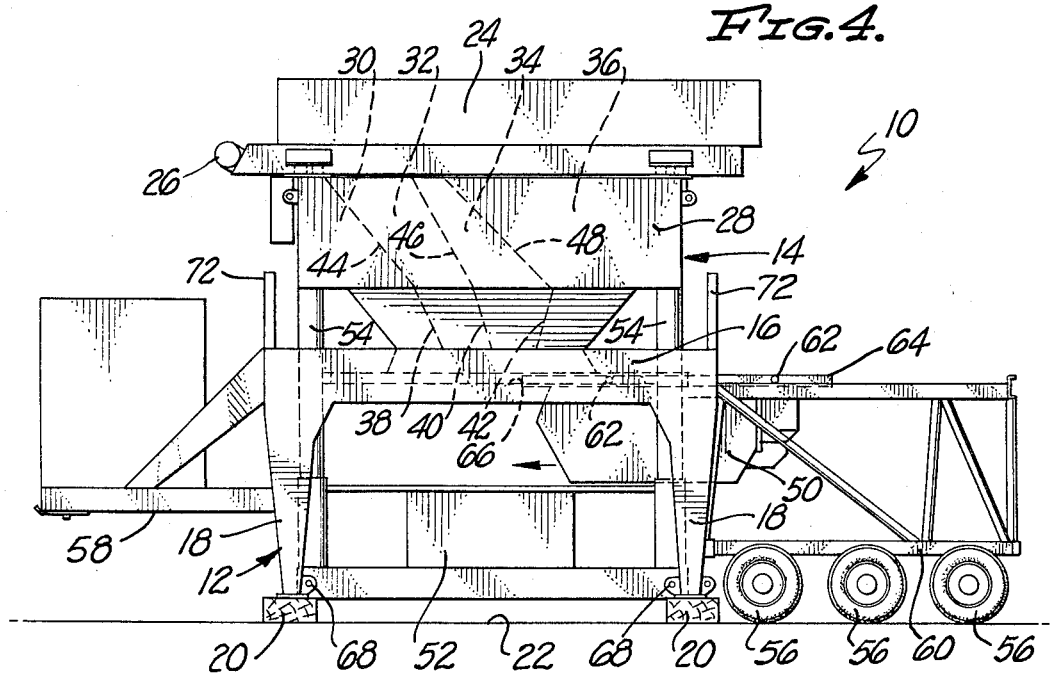

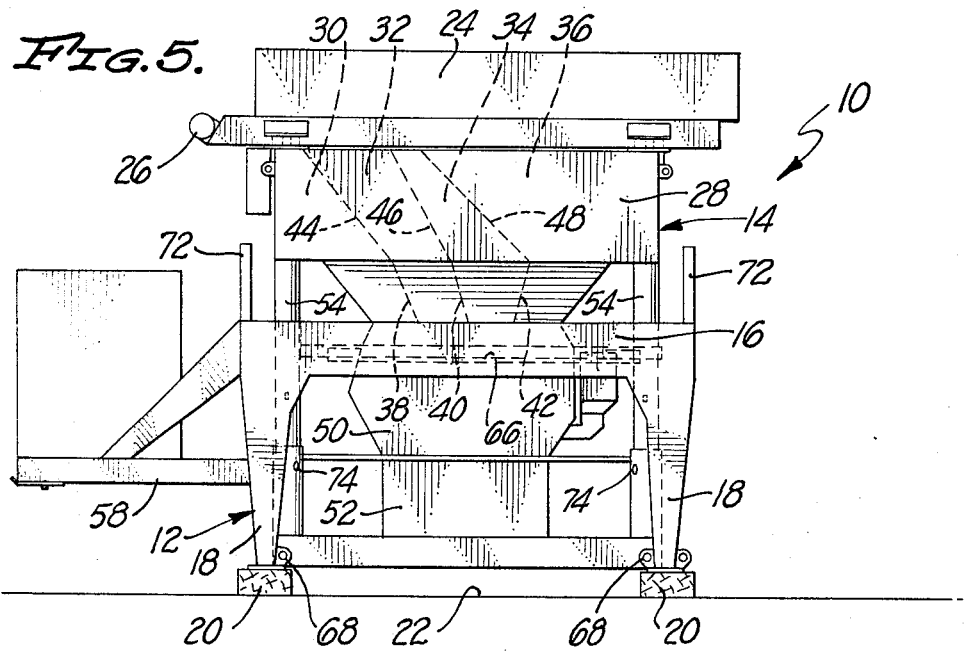
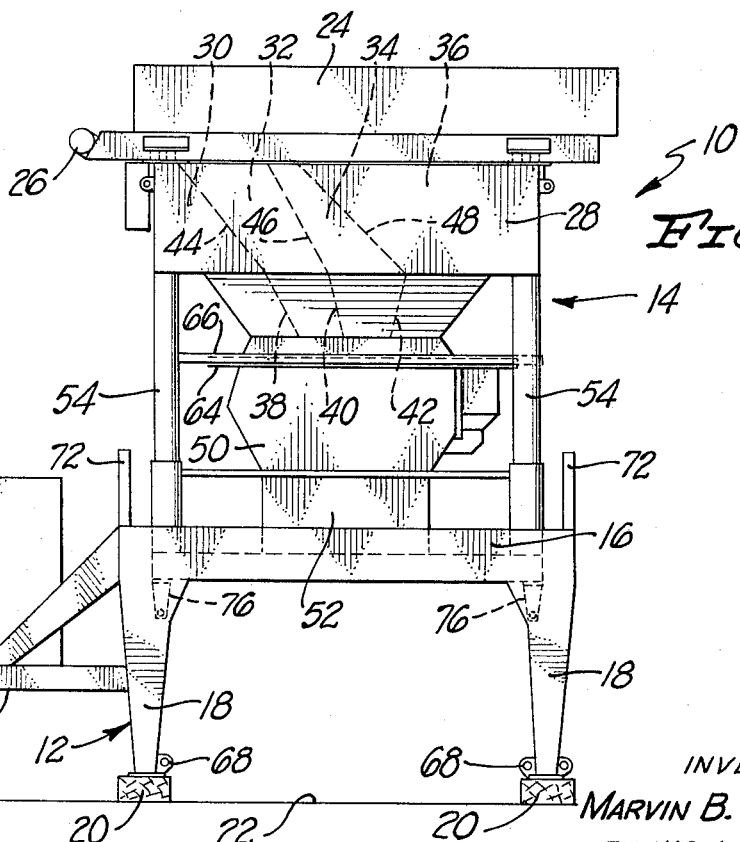

United States Patent Office 3,385,571
Patented May 28, 1968

3,385,571
MOBILE MIXING PLANT
Marvin B. Preeman, Los Angeles, Calif., assignor to Standard Steel Corporation, Los Angeles, Calif., a corporation of California
Filed Jan. 3, 1967, Ser. No. 606,853
6 Claims. (Cl. 259—154)

ABSTRACT OF THE DISCLOSURE

A mobile asphalt mixing plant comprising a base structure and a tower structure carried by the base structure, the tower structure comprising superimposed grading, storage, weighing and mixing sections. To reduce the height of the plant during transport, the weighing section is horizontally movable into a transport position spaced from the tower structure, and the remaining sections of the tower structure are telescoped together and retracted downwardly into the base structure.

BACKGROUND OF INVENTION AND PRIOR ART

The present invention relates in general to a mobile or portable plant and, more particularly, to a mobile mixing plant capable of producing asphalt mixes for paving projects, for example.

As disclosed in my Patents Nos. 3,116,051, issued Dec. 31, 1963, and 3,142,390, issued July 28, 1964, the general type of mobile mixing plant to which the present invention relates comprises a mobile base structure carrying various components essential to the operation of the plant. Among these are an upper aggregate grading section, e.g., an aggregate screening section, an aggregate storage section, e.g. a bin section, below the grading section, a weighing section below the aggregate storage section, and a mixing section below the weighing section. Aggregates from the storage section are weighed out in the weighing section and are mixed with asphalt, or the like, in the mixing section. Subsequently, the asphalt mix is discharged from the mixing section into a truck, or other receptacle, below the mixing section.

In a mobile mixing plant of the foregoing type, it is essential to minimize the over-all height of the plant for transport purposes, while making the plant sufficiently high when it is in operation to provide it with the desired capacity. In the mobile mixing plant of my Patent No. 3,116,051, this is accomplished by incorporating the grading, storage, weighing and mixing sections in a tower structure which is retractable downwardly into the base structure for transport, the storage section also receiving one of the other sections therein when the plant is in its retracted condition. In the mobile mixing plan of my Patent No. 3,142,390, the desired effect is achieved by separately transporting the weighing and mixing sections, and by retracting the grading and storage sections downwardly into the base structure. In the latter case, it is necessary to transport the base structure and the grading, storage, weighing and mixing sections as two separate units.

SUMMARY AND OBJECTS OF INVENTION

With the foregoing as background, the primary object of the present invention is to provide a mobile mixing plant wherein the base structure and the tower structure composed of the grading, storage, weighing and mixing sections are transportable as a single unit, and wherein one of the sections of the tower structure is horizontally withdrawable out of alignment with the other sections of the tower structure to reduce the over-all height of the plant when the tower structure is retracted downwardly into the base structure for transport purposes.

Another and important object of the present invention is to provide a mobile mixing plant of the foregoing character wherein one of the sections of the tower structure is carried by mobile means for transporting the base structure, in a position out of vertical alignment with the remaining sections of the tower structure.

More particularly, an object of the invention is to provide a mobile mixing plant which includes: a base structure; mobile means for transporting the base structure; a tower structure carried by the base structure and vertically movable between retracted and erected positions relative to the base structure; the tower structure including an upper grading section, an intermediate storage section and a lower mixing section; the grading and storage sections being vertically movable between retracted and erected positions relative to the mixing section and being spaced upwardly from the mixing section when in their erected positions relative to the mixing section; and a weighing section carried by the mobile means during transport and horizontally movable into a position between the grading and storage sections and the mixing section when the tower structure is in its retracted position relative to the base structure and when the grading and storage sections are in their erected positions relative to the mixing section.

A further object of the invention is to provide a tower structure which includes telescoping columns interconnecting the grading and storage sections and the mixing section and capable of being extended to provide space between the grading and storage sections and the mixing section to receive the horizontally insertable weighing section.

An additional object is to provide a tower structure wherein the grading section is vertically movable between retracted and erected positions relative to the storage section and is telescoped downwardly into the storage section when in its retracted position relative to the storage section, thereby further reducing the over-all height of the plant for transport.

The foregoing objects, advantages, features and results of the invention, together with various other objects, advantages, features and results thereof which will be evident to those skilled in the mobile plant art in the light of this disclosure, may be achieved with the exemplary embodiment of the invention described in detail hereinafter and illustrated in the accompanying drawings.

DESCRIPTION OF DRAWINGS

In the drawings:

FIGS. 1 to 6 are semidiagrammatic, side elevational views illustrating successive steps in the erection of the mobile mixing plant of the invention, the plant being shown in its transport condition in FIG. 1 and being shown in its erected condition in FIG. 6.

DETAILED DESCRIPTION OF PREFERRED EMBODIMENT OF INVENTION

Construction of mobile mixing plant 10

Referring initially to FIG. 6 of the drawings, the mobile mixing plant of the invention is illustrated therein in its erected condition and is designated generally by the numeral 10. The mixing plant 10 includes, as its major components, a base structure 12 and a tower structure 14. As will be described in detail hereinafter, the tower structure 14 is vertically telescopable relative to the base structure 12 between a lower, retracted position, shown in FIG. 1, and an upper, erected position, shown in FIG. 6. As will also be described hereinafter, the tower structure 14 is divided into sections which are vertically telescopable relative to each other between retracted positions, shown in FIG. 1, and erected positions, shown in FIG. 6.

In addition to the foregoing basic components, the mixing plant 10 includes other components which have been omitted from the drawings for convenience. Such other components may include an aggregate dryer, an aggregate elevator for elevating dried aggregates to the upper end of the erected tower structure 14, a dust collecting system for collecting dust discharged by the aggregate dryer, an asphalt supply system, and the like.

The base structure 12 includes an open, horizontal, rectangular frame 16 supported at its four corners by columns 18. The columns 18 at each end of the base structure 12 are seated on a transverse timber 20, or other suitable footing or footings. The space between the timbers 20 constitutes a driveway 22 for trucks, not shown, into which may be dumped batches of asphalt mixed in the tower structure 14 in a manner to be described. If necessary to provide additional clearance beneath the frame 16 of the base structure 12, the area between the timbers 20 may be excavated to provide a depressed driveway, not shown, taking care not to undermine the footings provided by the timbers.

The tower structure 14 includes an upper, grading section 24, e.g., a screen section adapted to be vibrated by vibrating means 26, for grading aggregates delivered thereto by the aforementioned aggregate elevator. Below the aggregate grading section 24 is an aggregate storage sectiton 28 divided into bins 30, 32, 34 and 36 for different aggregate grades. These bins are separated from each other by partitions 38, 40 and 42. These partitions have sections 44, 46 and 48 which are pivotable downwardly from generally vertical, operative positions into horizontal, inoperative positions, as disclosed in more detail in my aforementioned Patent No. 3,116,051. Additionally, the end walls of the storage section 28 have pivoted sections, not shown, which are retractable in a similar manner. When the pivoted partition sections 44, 46 and 48 and the pivoted end sections mentioned are retracted, the grading section 24 may be telescoped downwardly into the storage section 28, as will be described in more detail hereinafter.

Continuing to refer particularly to FIG. 6 of the drawings, when the tower structure 14 is in its erected condition, a weighing section 50 is disposed below the storage section 28 in a position to receive and weigh out aggregates from the various bins 30, 32, 34 and 36 as required for a particular mix. The weighing section 50 also weighs out the amount of asphalt required for the mix. The requisite amounts of the various aggregates and asphalt are discharged from the weighing section 50 into a mixing section 52 therebeneath. After mixing, the resulting asphalt mix is discharged from the mixing section 52 into a truck, or other receptacle, not shown, in the driveway 22 below the base-structure frame 16.

The tower structure 14 includes four telescoping columns 54 which are located within the base-structure frame 16 at the respective corners thereof and which interconnect the storage and mixing sections 28 and 52. The telescoping nature of the columns 54 permits vertical movement of the storage section 28 relative to the mixing section 52 between the retracted positions shown in FIG. 1, for example, and the erected position shown in FIG. 6, for example. When the grading and storage sections 24 and 28 are in the relative positions shown in FIG. 1, for example, the pivoted partition sections 44, 46 and 48 and end sections are retracted so that the grading section 24 is telescoped downwardly into the storage section 28. When the telescoping columns 54 are fully extended, as shown in FIGS. 4 to 6, there is sufficient space between the storage and mixing sections 28 and 52 to receive the weighing section 50 therebetween in a manner to be described.

In addition to the foregoing relative vertical movements of the grading, storage and mixing sections 24, 28 and 52 of the tower structure 14, the entire tower structure is vertically movable relative to the base structure 12, between the retracted position shown in FIG. 1, for example, and the extended position shown in FIG. 6. Suitable means are provided for guiding the tower structure 14 vertically relative to the base structure 12, and for erecting and lowering the tower structure, as disclosed in detail in my aforementioned prior patents, the disclosures of which are incorporated herein by reference. Consequently, no further description herein is required.

Referring particularly to FIG. 1 of the drawings, when the mobile mixing plant 10 of the invention is in its transport condition, it constitutes, in effect, a semitrailer having rear wheels 56 and a front tongue 58 engageable with a conventional tractor, not shown. The tongue 58 is suitably connected to one end of the base structure 12 and the rear wheels 56 are mounted on a trailer frame 60 bolted, or otherwise detachably connected, to the other end of the base structure. During transport, the weighing section 50 is carried by the trailer frame 60. During erection of the mixing plant 10, the weighing section 50 is horizontally insertable between the storage and mixing sections 28 and 52 of the tower structure 14. To achieve this, the weighing section 50 is provided with rollers 62 movable between horizontal tracks 64 on the trailer frame 60 and horizontal tracks 66 carried by the upper portions of the telescoping columns 54, as shown in FIG. 4 of the drawings.

*Transport and erection of mobile mixing plant 10*

During transport of the mobile mixing plant 10, the entire weight thereof is carried by the rear wheels 56 and a tractor, not shown, supporting and connected to the forwardly extending tongue 58. The weighing section 50 is carried by the trailer frame 60, as shown in FIG. 1 of the drawings, and the mixing section 52 is carried by the columns 18 of the base structure 12. The latter is accomplished by inserting pins, not shown, through holes 68 in the columns 18 and through corresponding holes, not shown, in the mixing section 52. The telescoping columns 54 are fully contracted so that the weights of the grading and storage sections 24 and 28 are also transferred to the base structure 12 through the aforementioned pins connecting the mixing section 52 to the base-structure columns 18. Additionally, during transport, the grading section 24 is telescoped downwardly into the storage section 28, the pivoted partition sections 44, 46 and 48 and end sections being retracted for this purpose.

Thus, during transport, the mobile mixing plant 10 is essentially in the condition shown in FIG. 1 of the drawings. The over-all height of the mobile mixing plant 10 in its retracted condition is little more than the height of the base structure 12, and is sufficiently small that the mobile mixing plant, in its retracted condition, can be transported under bridges, and the like, providing conventional clearances.

Upon arrival at the desired site, the lower ends of the columns 18 of the base structure 12 are seated on the timbers 20 and the tractor, not shown, supporting the tongue 58 is disconnected and driven away. During these preliminary operations, the pins connecting the mixing section 52 to the base-structure columns 18 are removed from the holes 68. At this point, the mixing section 52 rests on the timbers 20.

Turning to FIG. 2 of the drawings, the next operation is to elevate the contracted tower structure 14, utilizing the hoisting means hereinbefore mentioned, sufficiently to permit placement of transverse beams 70 between upstanding supports 72 on the base structure 12 and the grading section 24. As shown in FIG. 3 of the drawings, the beams 70 support the grading section 24 in an erected position relative to the storage section 28 upon subsequent lowering of the mixing section 52 onto the timbers 20. Under the conditions shown in FIG. 3, the storage section 28 has been moved downwardly into its operating position below the grading section 24. Also, the pivoted partition sections 44, 46 and 48 have been moved into their extended, operative positions.

Turning to FIG. 4 of the drawings, the next step is to elevate the grading and storage sections 24 and 28 into the positions shown in FIG. 4, relative to the mixing section 52. This may be accomplished by first elevating the grading, storage and mixing sections 24, 28 and 52 until the grading and storage sections are substantially in the positions of FIG. 4, and then temporarily latching the upper sections of the telescoping columns 54 to the base structure 12 in any suitable manner. Thereafter, the mixing section 52 is lowered onto the timbers 20, thereby extending the telescoping columns 54. There is now space between the storage and mixing sections 28 and 52 for the weighing section 50, which is then rolled horizontally into position along the tracks 64 and 66. It will be understood that, under the conditions shown in FIG. 4, the horizontal tracks 66 carried by the upper sections of the telescoping columns 54 are aligned with the horizontal tracks 64 on the trailer frame 60. After the weighing section 50 has been horizontally inserted between the storage and mixing sections 28 and 52 in this manner, the trailer frame 60 may be unbolted from the base structure 12 and parked in a suitable location.

Referring to FIG. 5 of the drawings, after completion of the foregoing operations, the mixing section 52 is elevated slightly above the timbers 20 to properly engage it with the weighing section 50, and to permit the insertion through the telescoping columns 54 of pins 74 for locking the telescoping sections of these columns together. This completes the erection of the various sections of the tower structure 14, and the final step is to elevate the tower structure 14 into its erected position, as shown in FIG. 6. The weight of the tower structure 14 may be carried by means of support brackets 76 bolted to the base-structure columns 18.

When it is desired to move the mobile mixing plant 10 to a new location, it may be returned to its transport condition by repeating the foregoing sequence of operations substantially in reverse order.

As will be apparent from the foregoing description, making the weighing section 50 a separate, roll-in unit which is carried by the trailer frame 60 during transport, results in a minimum over-all height for the mobile mixing plant 10 when in its transport condition, while providing the over-all height necessary for adequate capacity when the plant is in its erected condition. It will be noted that the additional height reduction for transport achieved through the use of the separate, roll-in weighing section 50 is approximately equal to the height of the weighing section 50, and this height reduction is achieved without breaking the base and tower structures 12 and 14 down into separately-transportable units, which is an important feature.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim as my invention:
1. In a mobile plant, the combination of:
 (a) a base structure;
 (b) mobile means for transporting said base structure;
 (c) a tower structure carried by said base structure and vertically movable between retracted and erected positions relative to said base structure;
 (d) said tower structure including upper and lower tower sections;
 (e) said upper tower section being movable between retracted and erected positions relative to said lower tower section; and
 (f) an intermediate tower section carried by said mobile means during transport in a transport position spaced horizontally from said tower structure, and horizontally movable from said transport position into a position between said upper tower section and said lower tower section when said tower structure is in its retracted position relative to said base structure and when said upper tower section is in its erected position relative to said lower tower section.

2. In a mobile mixing plant, the combination of:
 (a) a base structure;
 (b) mobile means for transporting said base structure;
 (c) a tower structure carried by said base structure and vertically movable between retracted and erected positions relative to said base structure;
 (d) said tower structure including an upper grading section, an intermediate storage section and a lower mixing section;
 (e) said grading and storage sections being vertically movable between retracted and erected positions relative to said mixing section and being spaced upwardly from said mixing section when in their erected positions relative to said mixing section; and
 (f) a weighing section carried by said mobile means during transport and horizontally movable into a position between said grading and storage sections and said mixing section when said tower structure is in its retracted position relative to said base structure and when said grading and storage sections are in their erected positions relative to said mixing section.

3. A mobile mixing plant as set forth in claim 2 wherein said tower structure is telescoped downwardly into said base structure when said tower structure is in its retracted position relative to said base structure and when said grading and storage sections are in their retracted positions relative to said mixing section.

4. A mobile mixing plant according to claim 3 wherein said tower structure includes telescoping columns interconnecting said grading and storage sections and said mixing section.

5. A mobile mixing plant as defined in claim 3 wherein said grading section is vertically movable between retracted and erected positions relative to said storage section and is telescoped downwardly into said storage section when in its retracted position relative to said storage section.

6. A mobile mixing plant as set forth in claim 5 wherein said storage section includes partitions which are movable between extended and retracted positions and which are in their retracted positions when said grading section is telescoped downwardly into said storage section.

References Cited
UNITED STATES PATENTS

| | | | |
|---|---|---|---|
| 2,106,008 | 1/1938 | Kuhrts | 259—153 |
| 2,256,484 | 9/1941 | Kemp | 259—153 |
| 3,116,051 | 12/1963 | Preeman | 259—153 |

ROBERT W. JENKINS, *Primary Examiner.*